US008316362B2

(12) United States Patent
Pan et al.

(10) Patent No.: US 8,316,362 B2
(45) Date of Patent: Nov. 20, 2012

(54) METHOD FOR UPDATING A PROGRAM SECTION

(75) Inventors: Chih-Hung Pan, Taipei Hsien (TW); Hung-Hsiang Hsu, Taipei Hsien (TW); Shih-Chieh Tzeng, Taipei Hsien (TW)

(73) Assignee: Wistron Neweb Corp., Taipei Hsien (TW)

( * ) Notice: Subject to any disclaimer, the term of this patent is extended or adjusted under 35 U.S.C. 154(b) by 402 days.

(21) Appl. No.: 12/801,409

(22) Filed: Jun. 8, 2010

(65) Prior Publication Data

US 2011/0010510 A1    Jan. 13, 2011

(30) Foreign Application Priority Data

Jul. 10, 2009   (TW) ................................ 98123448 A

(51) Int. Cl.
*G06F 9/44* (2006.01)
*G06F 3/00* (2006.01)
(52) U.S. Cl. ........................................ 717/168; 719/327
(58) Field of Classification Search .......... 717/168–178; 713/1, 2; 719/327
See application file for complete search history.

(56) References Cited

U.S. PATENT DOCUMENTS

| 6,357,021 | B1 * | 3/2002 | Kitagawa et al. | 714/41 |
| 6,775,423 | B2 * | 8/2004 | Kulkarni et al. | 382/305 |
| 7,272,706 | B2 * | 9/2007 | Ben Ismail et al. | 713/1 |
| 7,334,117 | B2 * | 2/2008 | Wilson et al. | 713/1 |
| 7,624,392 | B2 * | 11/2009 | Bando | 717/169 |
| 2002/0034105 | A1 * | 3/2002 | Kulkarni et al. | 365/200 |
| 2004/0034861 | A1 * | 2/2004 | Ballai | 719/321 |
| 2004/0103177 | A1 * | 5/2004 | Ben Ismail et al. | 709/222 |
| 2005/0246701 | A1 * | 11/2005 | Kanapathipillai et al. | 717/168 |
| 2006/0031623 | A1 * | 2/2006 | Bando | 710/313 |
| 2006/0031664 | A1 * | 2/2006 | Wilson et al. | 713/1 |
| 2006/0092323 | A1 * | 5/2006 | Feeler et al. | 348/553 |
| 2006/0218309 | A1 * | 9/2006 | Young et al. | 710/8 |
| 2007/0261046 | A1 * | 11/2007 | Miller | 717/168 |

* cited by examiner

*Primary Examiner* — Wei Zhen
*Assistant Examiner* — Qing Chen
(74) *Attorney, Agent, or Firm* — Bacon & Thomas, PLLC

(57) ABSTRACT

A method for updating a program section is disclosed; the method is used for an electronic system. The electronic system comprises a control unit and a storage device; the control unit is electrically connected with the storage device; the storage device comprises a program section; the program section comprises an application section and a boot section; the application section comprises a first bootloader and application information, wherein the first bootloader comprises a first driver. The method comprises the following steps of: connecting a data source device, wherein the data source device comprises update data; determining whether the first driver is able to drive the data source device or not; and if the first driver is able to drive the data source device, the first driver performs an updating procedure according to the update data.

5 Claims, 9 Drawing Sheets

METHOD FOR UPDATING A PROGRAM SECTION

BACKGROUND OF THE INVENTION

1. Field of the Invention

The present invention relates to a method for updating a program section, and more particularly, to a program section updating method which allows the bootloader to drive multiple data source devices.

2. Description of the Related Art

Due to the boot section storage space limitations of a micro controller unit, electronic products nowadays are limited in the number of functions and drivers that can be incorporated in the boot section.

FIG. 1 shows the prior art. As shown in FIG. 1, the prior art comprises a storage device having a program section 30a, which comprises an application section 31a and a boot section 32a. In the configuration of the prior art, application section 31a cannot execute other programs during the updating process; therefore, the bootloader is always installed in the boot section.

However, the storage space of boot section 32a is very limited (usually a few Kbytes); therefore, boot section 32a can store very little data. For example, when the user needs to update application section 31a of an electronic device, but the size of the USB device driver or other system driver is larger than the remaining storage space on boot section 32a, then the device cannot be updated through the USB device or through a network. As a result, the user needs to return the electronic device to the maintenance shop for further service. This is very inconvenient for a user.

Moreover, the storage of application section 31a is often allocated with a larger space (usually a few Mbytes), but the space is not fully utilized. Therefore, a new method for updating a program section by exploiting the storage space of the application section is needed in order to overcome the problem caused by the limited storage space of the boot section.

SUMMARY OF THE INVENTION

The object of the present invention is to provide a method for updating a program section, more particularly, by exploiting the storage space of the application section such that a bootloader is able to drive multiple data source devices.

To achieve the above objective, a method for updating a program section is provided by the present invention for an electronic system. The electronic system comprises a control unit and a storage device; the control unit is electrically connected with the storage device; the storage device comprises a program section; the program section comprises an application section and a boot section; the application comprises a first bootloader and application information, wherein the first bootloader comprises instructions to execute a first driver.

The method comprises the following steps: connecting a data source device, wherein the data source device comprises update data; determining whether the first driver is able to drive the data source device or not; and if the first driver is able to drive the data source device, the first driver performs an updating procedure according to the update data.

To achieve the above objective, another method for updating a program section is provided by the present invention for an electronic system. The electronic system comprises a control unit and a storage device; the control unit is electrically connected with the storage device; the storage device comprises a program section; the program section comprises an application section and a boot section; the boot section comprises an initial bootloader; the application comprises a first bootloader and application information, wherein the first bootloader comprises instructions to execute a first driver.

The method comprises the following steps: connecting to a data source device, wherein the data source device comprises update data; determining whether the initial driver or the first driver is able to drive the data source device or not; and if one of the drivers is able to drive the data source device, then loading the update information and performing an updating procedure.

DETAILED DESCRIPTION OF THE PREFERRED EMBODIMENT

The advantages and innovative features of the invention will become more apparent from the following preferred embodiments.

Figure 1:
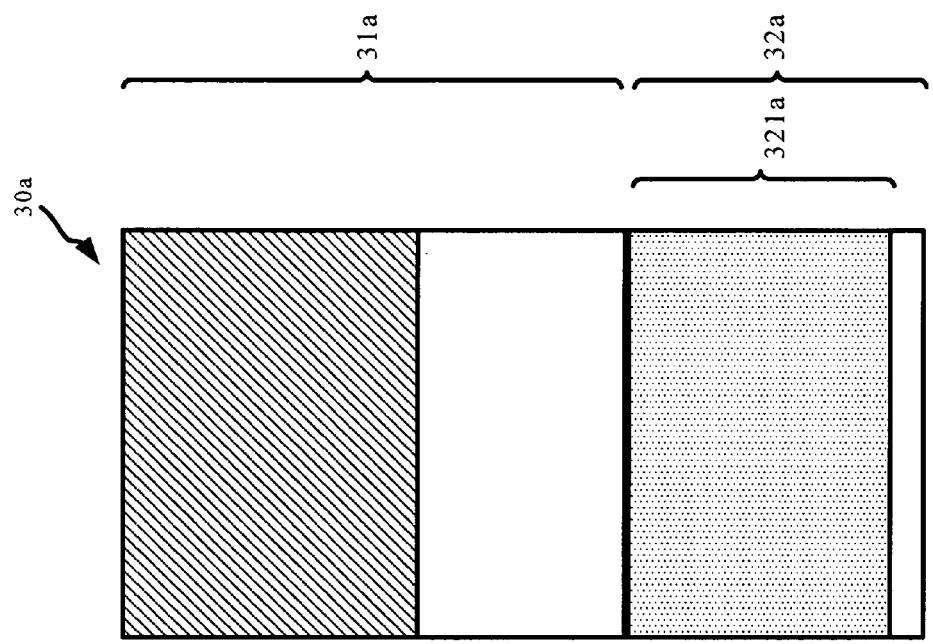
FIG. 1 shows a method for updating a program section of the prior art.
Figure 2:
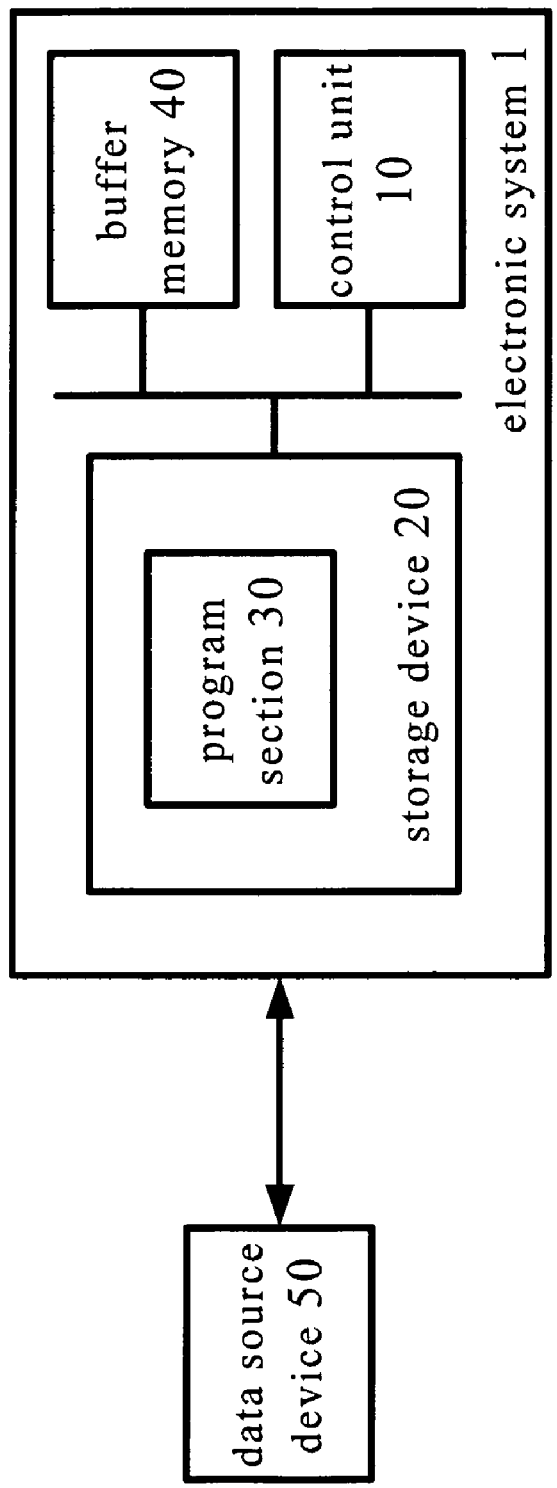
FIG. 2 is a structural diagram of an electronic system, showing an embodiment for updating a program section.

Refer to FIG. 2 to FIG. 8, which show the first embodiment for the method of updating a program section of the present invention. Take note that although the method is described using an electronic system 1 (for example, a satellite radio with a micro controller unit) as shown in FIG. 2, the method for updating a program section of the present invention is not limited to electronic system 1.

In one embodiment of the present invention as shown in FIG. 2, the electronic system 1 comprises a control unit 10, a storage device 20 and a buffer memory 40. The control unit 10 is electrically connected with the storage device 20 and the buffer memory 40. The storage device 20 comprises a program section 30.

Figure 3:
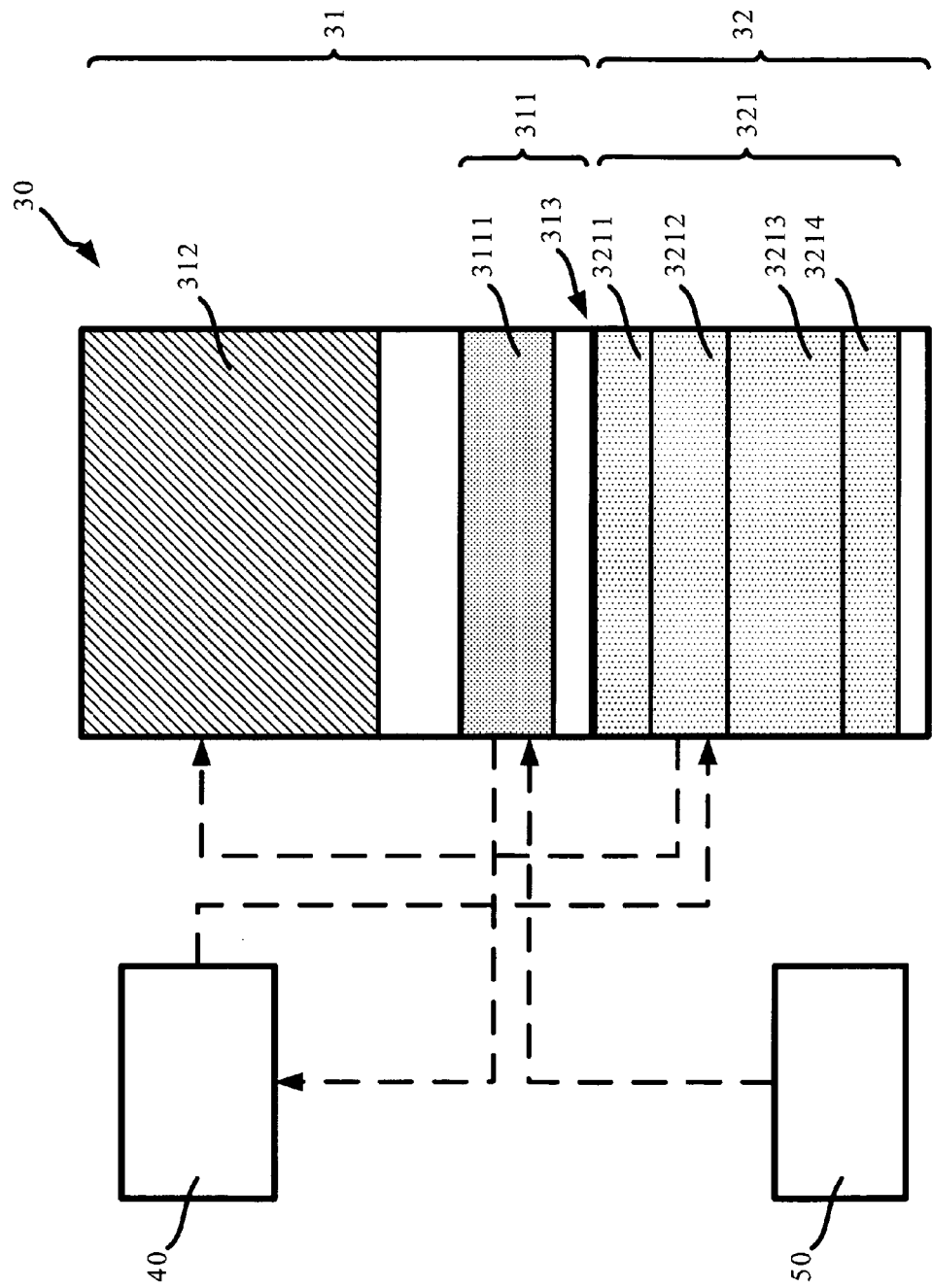
FIG. 3 is an updating procedure, showing a first embodiment which uses a first driver for updating a program section.

As shown in FIG. 3, the program section 30 comprises an application section 31 and a boot section 32; the application section 31 comprises a first bootloader 311 and the application information 312. On the program section 30, the application section 31 ends at an interrupt vector region 313.

Figure 4:
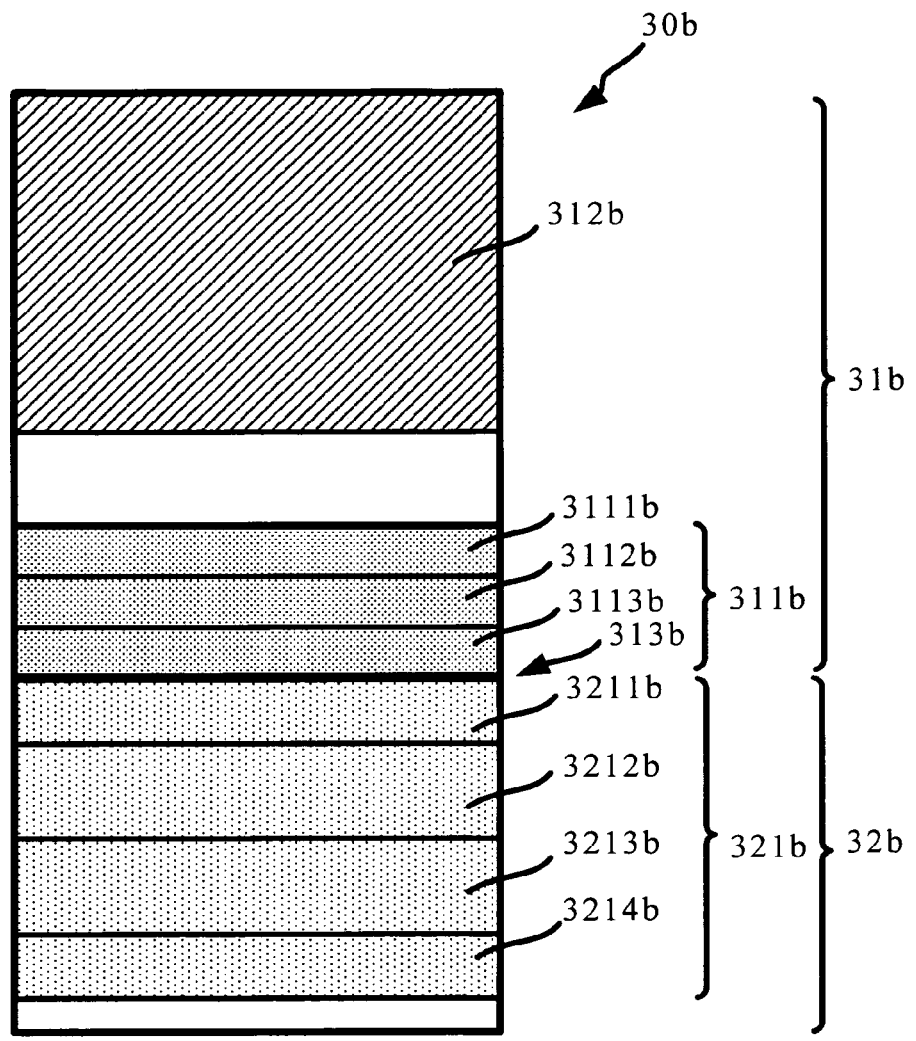
FIG. 4 is a program sectional diagram, showing an embodiment for updating a program section.

The first bootloader 311 comprises instructions to execute at least a first driver 3111. Please note that, In another embodiment as shown in FIG. 4, the first bootloader 311b is not limited to executing exclusively on the first driver 3111b. The first bootloader 311b can include instructions to execute a second driver 3112b and a third driver 3113b.

As shown in FIG. 3, the boot section 32 comprises an initial bootloader 321; the initial bootloader 321 comprises a boot vector 3211, a write flash application programming interface (write flash API) 3212, an initial driver 3213, and a main program 3214. In one embodiment of the present invention, the write flash API 3212 is used to control either the first driver 3111 or the initial driver 3213 to drive the data source device 50, and then to store the information from the data source into the buffer memory 40. Please note that the initial bootloader does not necessarily require a boot vector component. In one embodiment, a boot vector can exist independently at the boot section.

In one embodiment of the present invention, the electronic system 1 is demonstrated using a Micro Controller Unit (MCU) of a satellite radio, but the present invention is not limited to this unit. In one embodiment of the present invention, the storage device 20 is demonstrated using a flash memory, but the present invention is not limited in using a flash memory. Please note that the buffer memory is not an essential component in the electronic system of the present invention; the buffer memory can be a separate component connected to the electronic system externally.

The following passage explains the method for updating a program section with the steps of the first embodiment.

Figure 5:
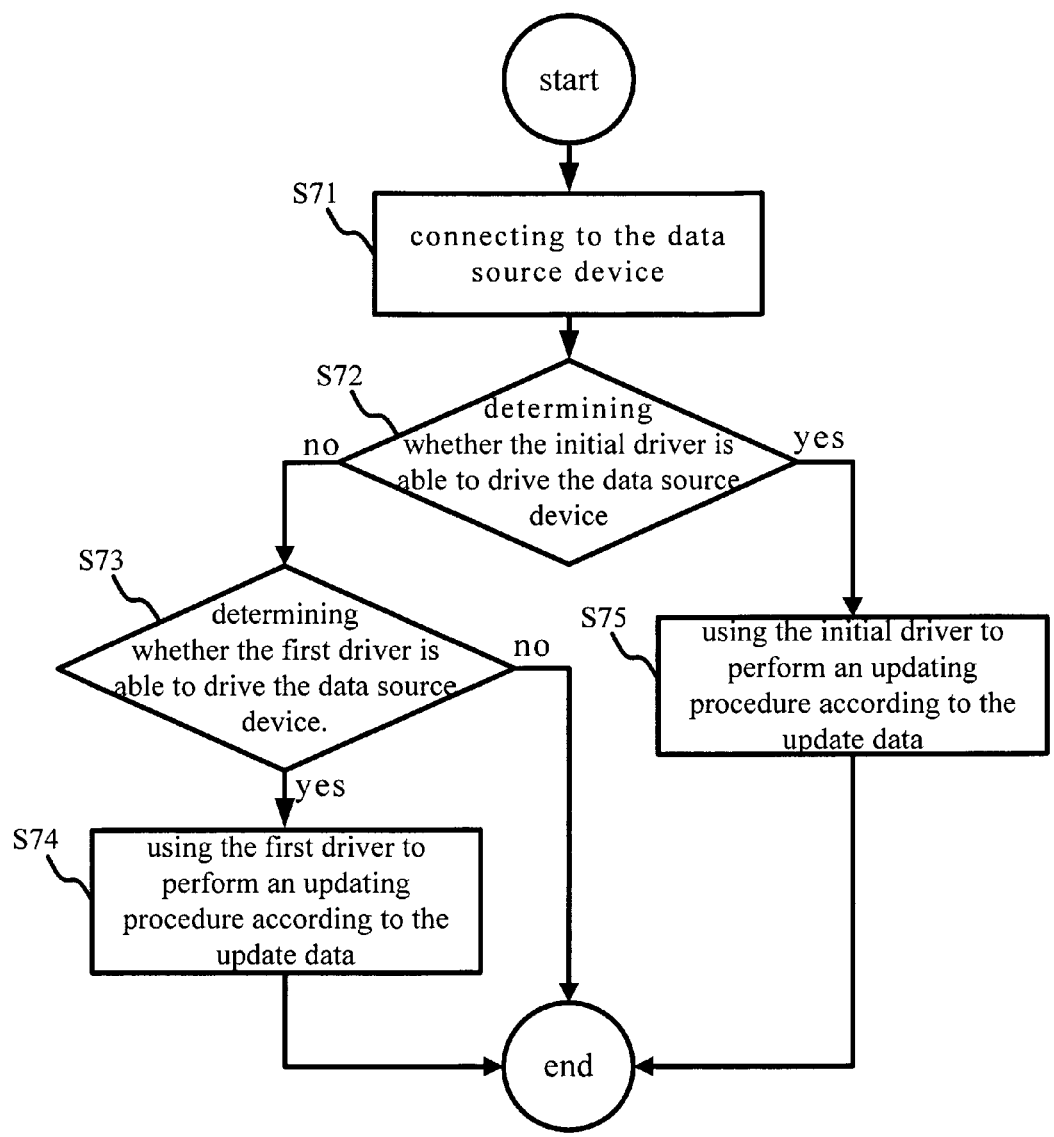
FIG. 5 is a flow chart, showing the first embodiment for updating a program section.

As shown in FIG. 5, the first embodiment of the present invention begins with step S71: connecting to the data source device.

In one embodiment of the present invention, the electronic system 1 is followed by a power on or a reset procedure after electronic system 1 is electrically connected with data source device 50 (as shown in FIG. 2). Data source device 50 comprises the update data. The update data is used to renew the application information 312. In one embodiment, the data source device 50 is demonstrated using a Universal Serial Bus (USB) device, but the present invention is not limited to a USB device. For example, the data source device 50 can be a Universal Asynchronous Receiver/Transmitter (UART) or a memory card (such as a secure digital memory card).

Next, the process continues with step S72: determining whether the initial driver is able to drive the data source device.

In one embodiment, after the electronic system 1 is powered on or reset, the main program 3214 then determines whether the initial driver 3213 is able to drive the data source device 50. More particularly, the main program 3214 is used to determine whether the initial driver 3213 is able to drive the data source device 50 and retrieve the update data format from the device.

Figure 6:
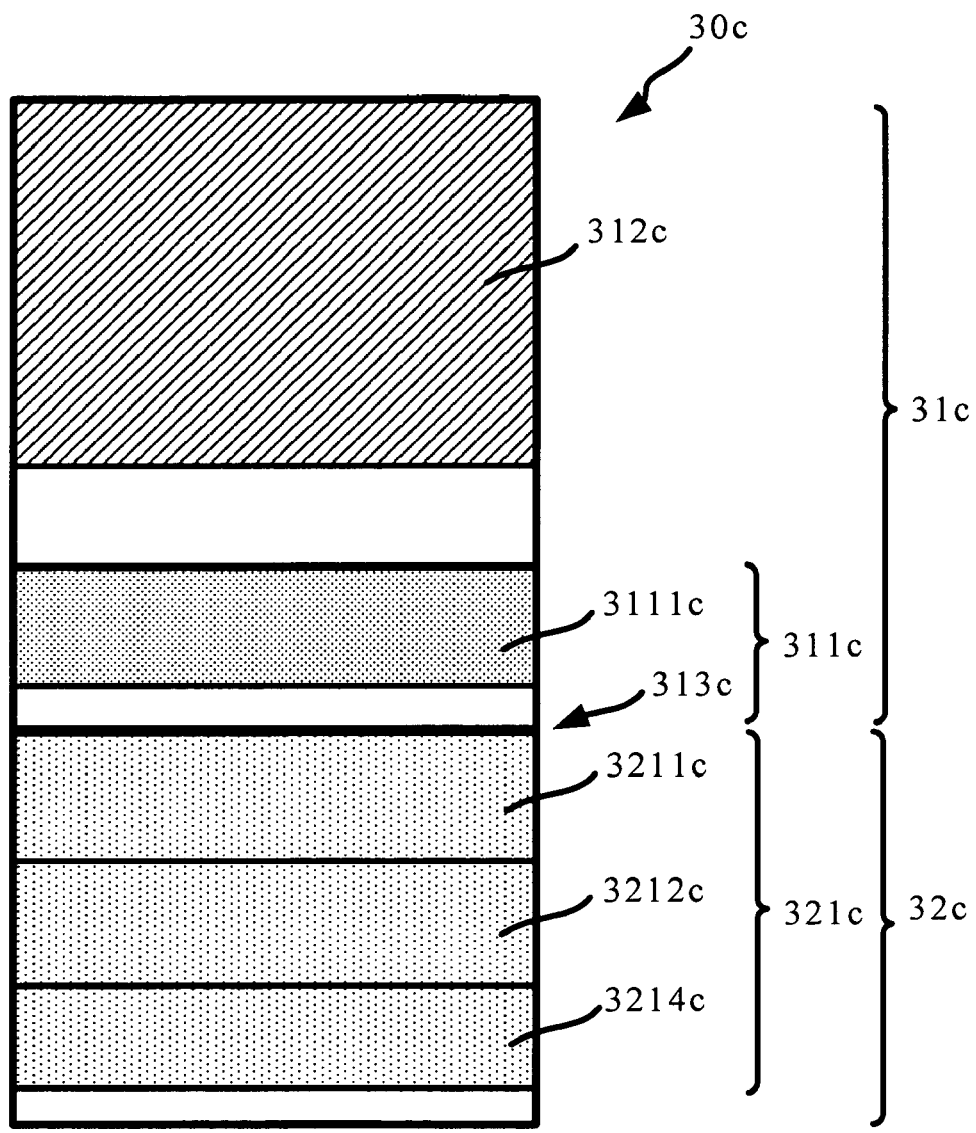
FIG. 6 is a program sectional diagram, showing an embodiment for updating a program section.

Please take note that step S72 is not a necessary step in the present invention. In another embodiment, as shown in FIG. 6, the initial bootloader 321c of the program section 30c does not contain an initial driver; therefore, step S72 can be omitted, and step S73 can then be directly executed after step S71.

As shown in FIG. 5, if the main program 3214 determines that the initial driver 3213 is able to drive the data source device 50, it then proceeds to step S75: using the initial driver to perform an updating procedure according to the update data. If the main program 3214 determines that initial driver 3213 cannot drive the data source device 50, it then proceeds to step S73: determining whether the first driver is able to drive the data source device.

If main program 3214 determines that the first driver 3111 is able to drive the data source device 50, it then proceeds to step S74: using the first driver to perform an updating procedure according to the update data.

With the above method of updating a program section and through the utilization of the application section storage space, the bootloader is able to drive more data source devices. Furthermore, the sequence of determining which driver is to be used in the boot section or the application section for driving the data source device can be assigned arbitrarily; it is not necessary to follow or be limited to the sequence of the present design.

In one embodiment, the main program is not only limited to being located in the initial bootloader. For example, the main program can also be allocated in the first bootloader, but the present invention is not limited to this design.

Figure 7:
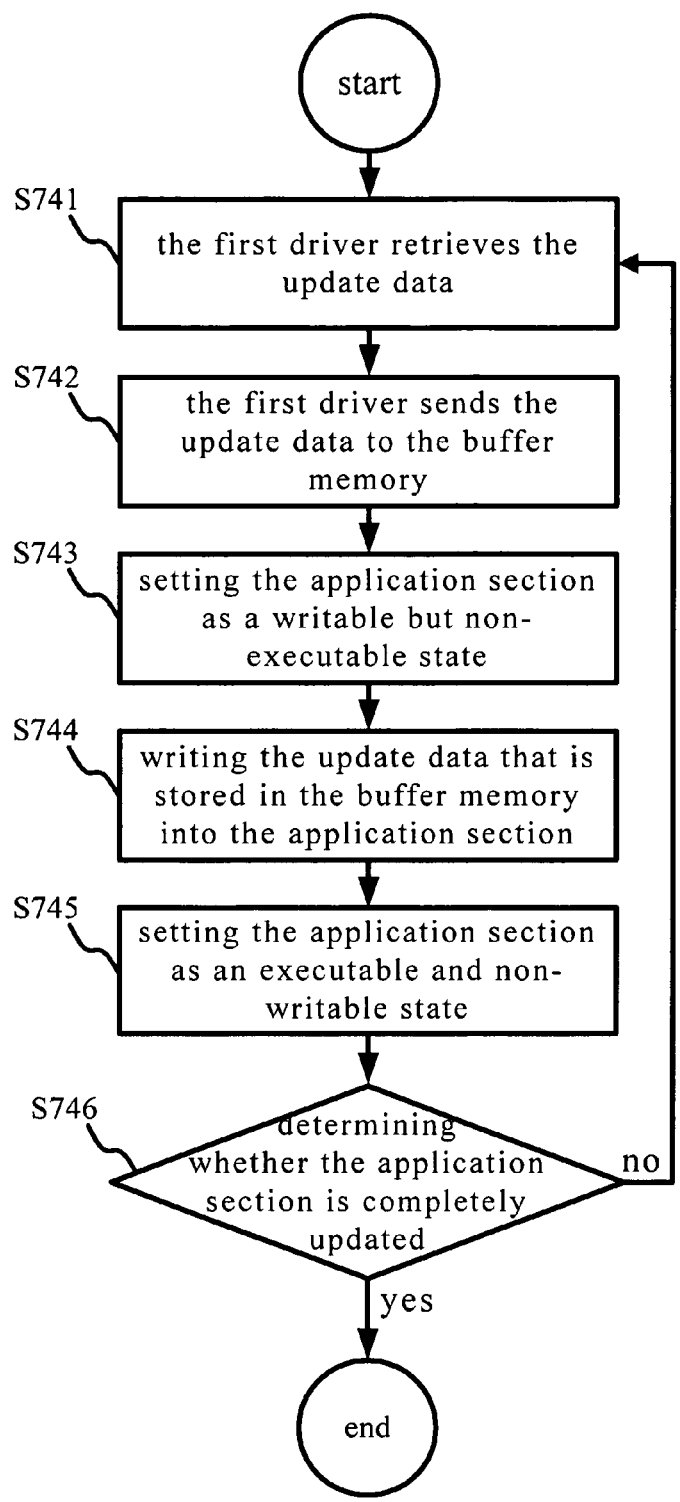
FIG. 7 is a flow chart, showing the first embodiment for updating a program section.

Refer to FIG. 3 and FIG. 7. In one embodiment, the updating procedure performed through the first driver 3111 comprises the following steps.

As shown in FIG. 7, step S741: the first driver retrieves the update data.

Step S742: the first driver sends the update data to the buffer memory.

Please note that if the update data exceeds the storage space of buffer memory 40, then the first driver 3111 will only send partial update data to the buffer memory 40.

Step S743: setting the application section as a writable but non-executable state.

In one embodiment, the write flash API 3212 sets the application section 31 as a writable but non-executable state.

Step S744: writing the update data that is stored in the buffer memory into the application section.

In one embodiment, the application section 31 cannot execute the program while the application section 31 is being written; therefore, the write flash API 3212 should be used to write the update data, which is stored in the buffer memory 40, into the application section 31 during the data updating process.

Step S745: setting the application section as an executable and non-writable state.

In one embodiment, the write flash API 3212 will set application section 31 as an executable and non-writable state after the data, which is stored in the buffer memory 40, is written to application section 31.

The last step is step S746: determining whether the application section is completely updated.

In one embodiment, step S741 to S746 will be repeated if the update data is not completely updated.

If the main program 3214 determines that the initial driver 3213 is able to drive the data source device 50, it then proceeds with step S75: using the initial driver to perform an updating procedure according to the update data.

Figure 8:
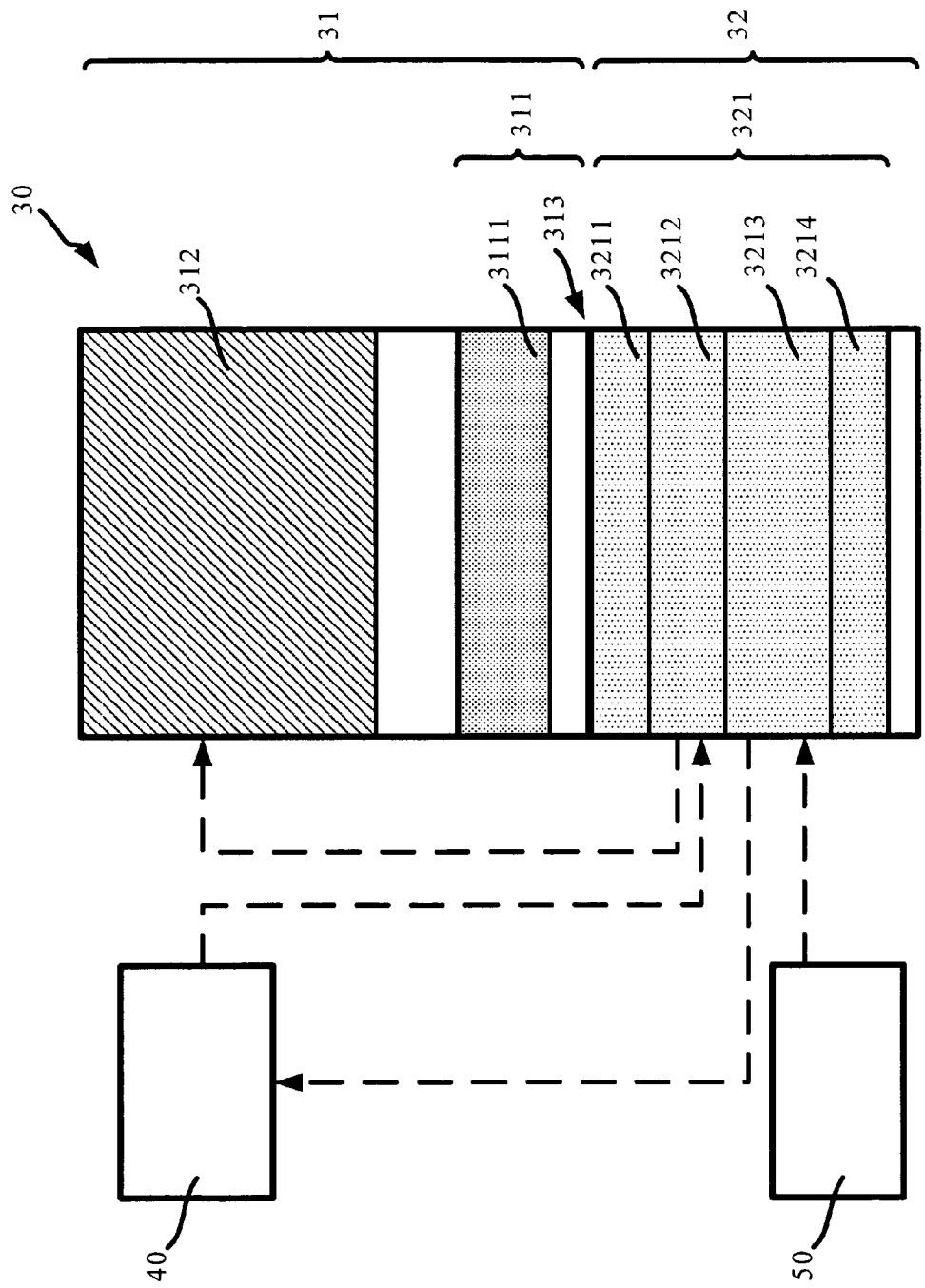
FIG. 8 is an updating procedure, showing the first embodiment, which uses an initial driver for updating a program section.

In one embodiment, as shown in FIG. 8, initial driver 3213 retrieves the update data and sends the update data to the buffer memory 40. Please note that if the update data exceeds the storage space of the buffer memory 40, then initial driver 3213 will only send partial update data to the buffer memory 40.

Next, the write flash API 3212 sets the application section 31 as a writable but non-executable state, after which the write flash API 3212 writes the update data, which is stored in buffer memory 40, into the application section 31. If the update data is not completely transferred to the buffer memory 40, then the initial driver 3213 will continue transferring the remaining update data into the buffer memory 40, and the write flash API 3212 will write the update data, which is stored in the buffer memory 40, into the application section 31. After the update data is completely updated, the write flash API 3212 will set the application section 31 into an executable and non-writable state. In one embodiment, the write flash API 3212 writes the update data, which is stored in buffer memory 40, into the application information 312, but the present invention is not limited to this process.

Take note that experienced users with knowledge in this field can alter the sequence of the above steps or execute some of the steps simultaneously to achieve the same result.

Next, refer to FIG. 2, FIG. 3, FIG. 7 and FIG. 9, which illustrate a second embodiment, showing the method for updating a program section.

The difference between the second embodiment and the first embodiment lies within the main program 3214. In this embodiment, the main program 3214 can be used to determine simultaneously whether the initial driver 3213 or the first driver 3111 is able to drive the data source device 50.

Figure 9:
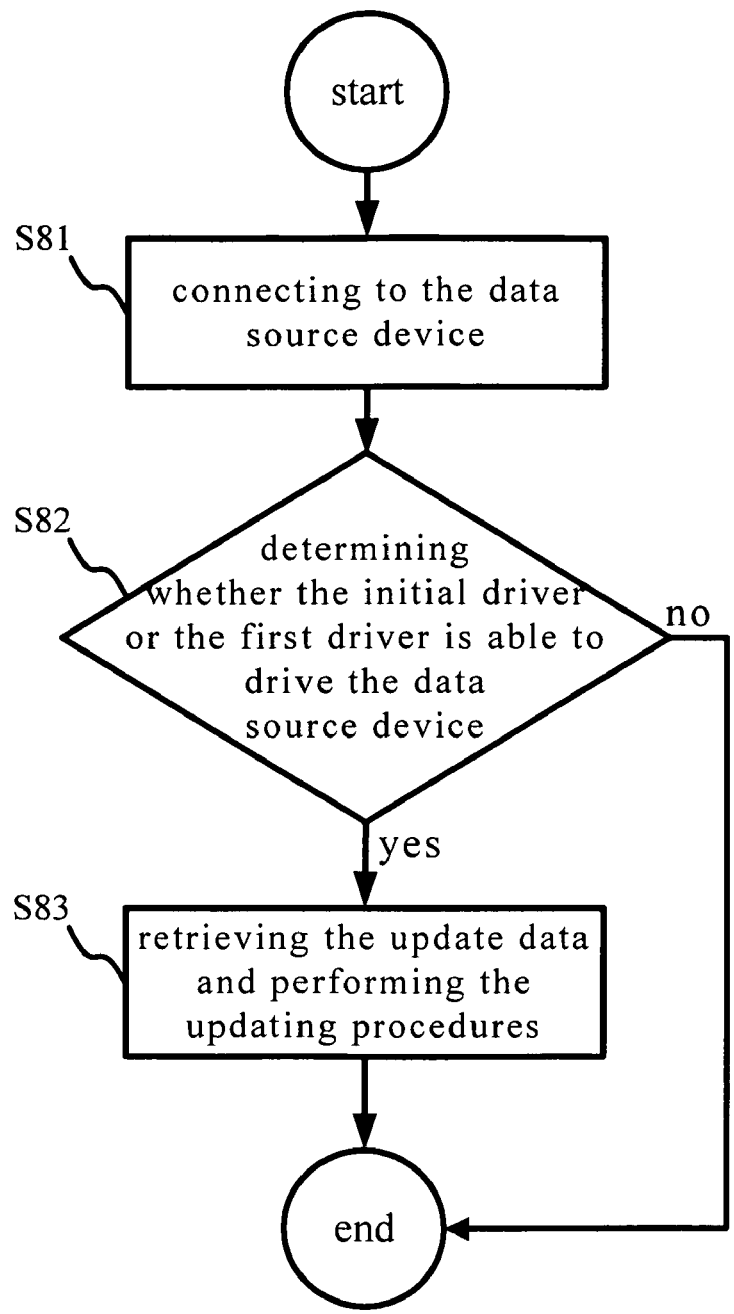
FIG. 9 is a flow chart, showing a second embodiment for updating a program section.

As shown in FIG. 9, the second embodiment begins with step S81: connecting to the data source device.

The embodiment of connecting to the data source device 50 has been explained above, and thus will not be described further.

Next proceed with step S82: determining whether the initial driver or the first driver is able to drive the data source device.

In one embodiment, the main program 3214 is used to determine whether the initial driver 3213 or the first driver 3111 is able to drive the data source device 50, but the present invention is not limited to this configuration. For example, as shown in FIG. 4, if the first bootloader 311b further comprises executing a second driver 3112b and executing a third driver 3113b, then the main program 3214b is used to determine whether the initial driver 3213b, the first driver 3111b, the second driver 3112b, or the third driver 3113b is able to drive the data source device.

As shown in FIG. 9, if either the initial driver 3213 or the first driver 3111 is able to drive the data source device 50, then the method proceeds to step S83: retrieving the update data and performing the updating procedures.

Take note that the data updating procedures initiated by the first driver 3111 or the initial driver 3213 are described in the first embodiment; thus, they will not be further described.

Although the present invention has been explained in relation to its preferred embodiment, it is also of vital importance to acknowledge that many other possible modifications and variations can be made without departing from the spirit and scope of the invention as hereinafter claimed.

What is claimed is:

1. A method for updating a program section for an electronic system, wherein the electronic system comprises a control unit, a buffer memory, and a storage device, wherein the control unit is electrically connected with the buffer memory and the storage device, wherein the storage device comprises a program section, wherein the program section comprises an application section and a boot section, wherein the application section comprising a first bootloader, wherein the first bootloader comprises instructions to execute a first driver, wherein the method for updating a program section comprises the following steps:
    connecting a data source device to the electronic system, wherein the data source device contains update data;
    determining whether the first driver is able to drive the data source device or not; and
    if the first driver is able to drive the data source device, the first driver then performing an updating procedure according to the update data, wherein the first driver performing the updating procedure according to the update data further comprises the following steps:
    using the first driver to retrieve the update data;
    transferring the update data to the buffer memory;
    setting the application section as a writable but non-executable state; and
    writing the update data, which is stored in the buffer memory, into the application section.

2. The method for updating a program section as claimed in claim 1, wherein the boot section comprises an initial bootloader, wherein the initial bootloader comprises an initial driver and the initial bootloader performs the following steps after being connected to the data source device:
    determining whether the initial driver is able to drive the data source device or not;
    if the initial driver is able to drive the data source device, the initial driver then performing an updating procedure according to the update data; and
    if the initial driver is unable to drive the data source device, then proceeding with the step of determining whether the first driver is able to drive the data source device or not.

3. The method for updating a program section as claimed in claim 1, wherein the step of writing the update data, which is stored in the buffer memory, into the application section further comprises the following steps:
    setting the application section as an executable but non-writable state;
    determining whether the application section is completely updated; and
    if the application section is not completely updated, then proceeding with the step of using the first driver to retrieve the update data.

4. A method for updating a program section for an electronic system, wherein the electronic system comprises a control unit, a buffer memory, and a storage device, wherein the control unit is electrically connected with the buffer memory and the storage device, wherein the storage device comprises a program section, wherein the program section comprises an application section and a boot section, wherein the application section comprises a first bootloader, wherein the first bootloader comprises instructions to execute a first driver, wherein the boot section comprises an initial bootloader, wherein the initial bootloader comprises an initial driver; wherein the method for updating a program section comprises the following steps:
    connecting a data source device to the electronic system, wherein the data source device contains update data;
    determining whether either the initial driver or the first driver is able to drive the data source device or not; and
    if either the initial driver or the first driver is able to drive the data source device, then performing an updating procedure according to the update data, wherein the first driver performing the updating procedure according to the update data further comprises the following steps:
    using the first driver to retrieve the update data;
    transferring the update data to the buffer memory;
    setting the application section as a writable but non-executable state; and
    writing the update data, which is stored in the buffer memory, into the application section.

5. The method for updating a program section as claimed in claim 4, wherein the step of writing the update data, which is stored in the buffer memory, into the application section further comprises the following steps:
    setting the application section as an executable but non-writable state;
    determining whether the application section is completely updated; and
    if the application section is not completely updated, then proceeding with the step of using the first driver to retrieve the update data.

* * * * *